Patented Aug. 11, 1925.

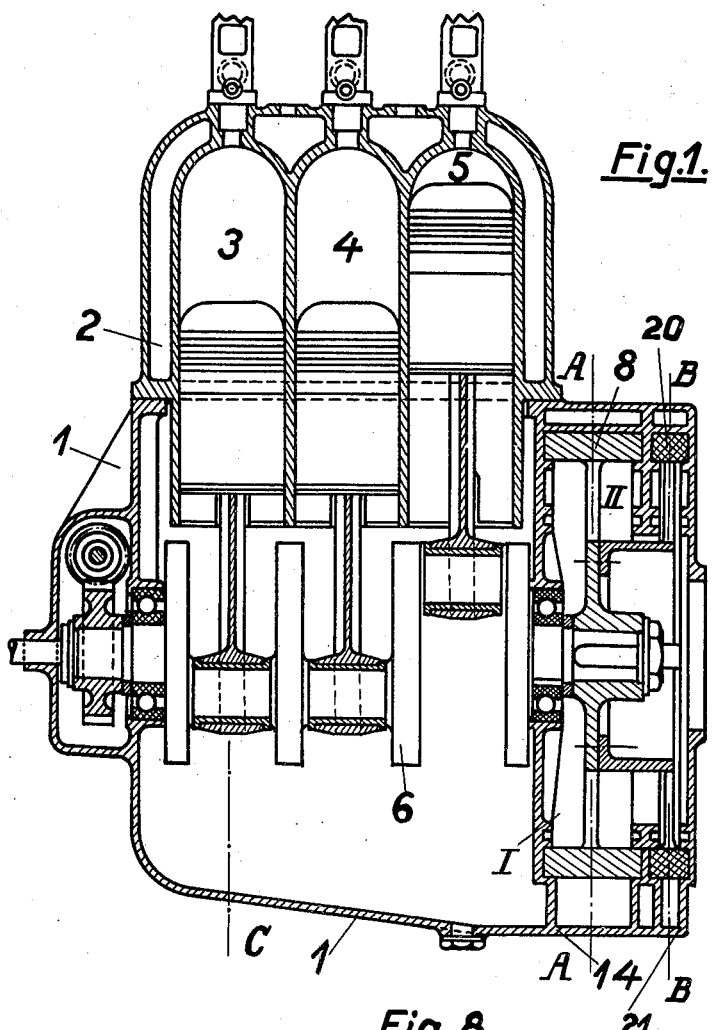
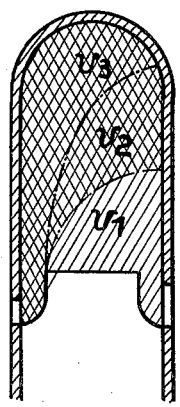

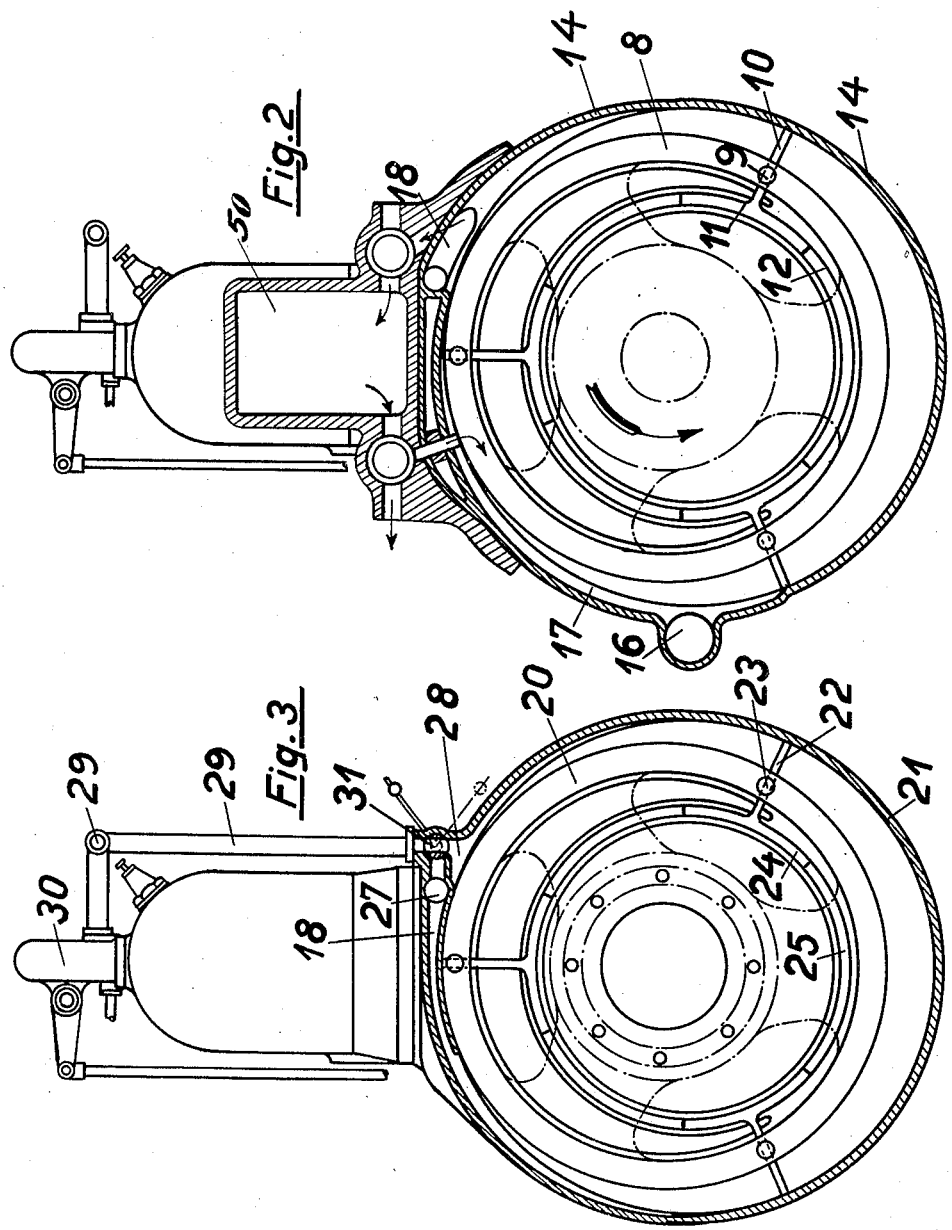

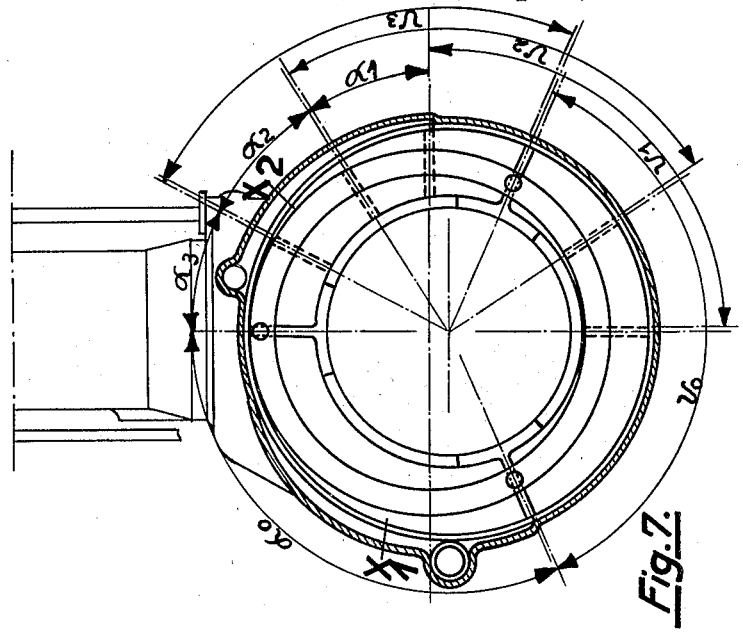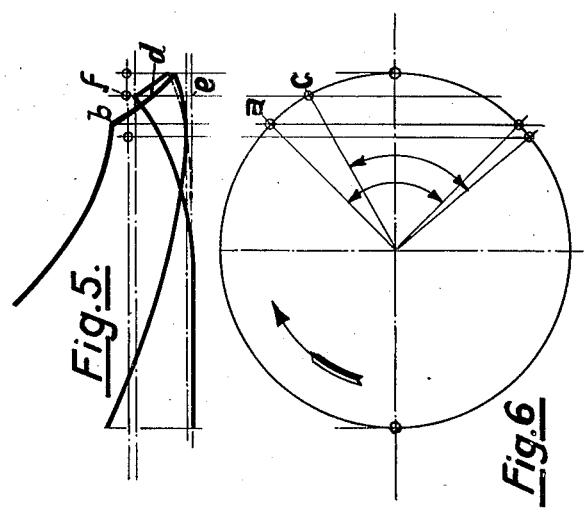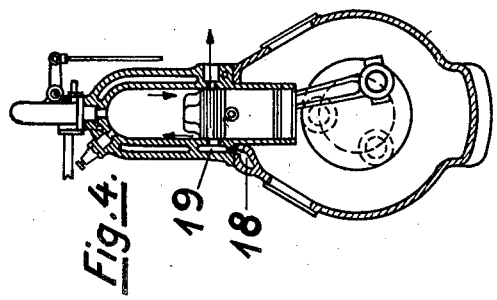

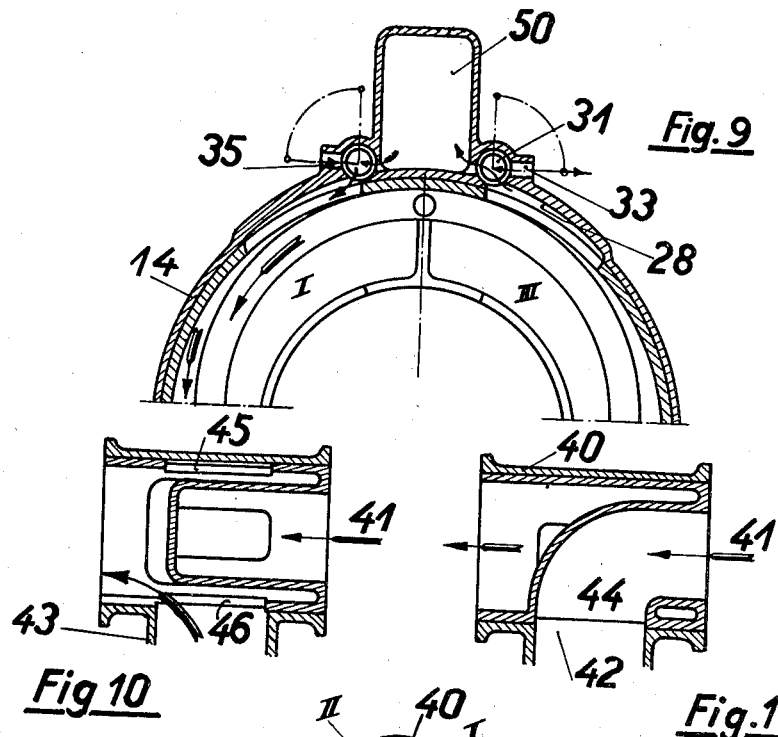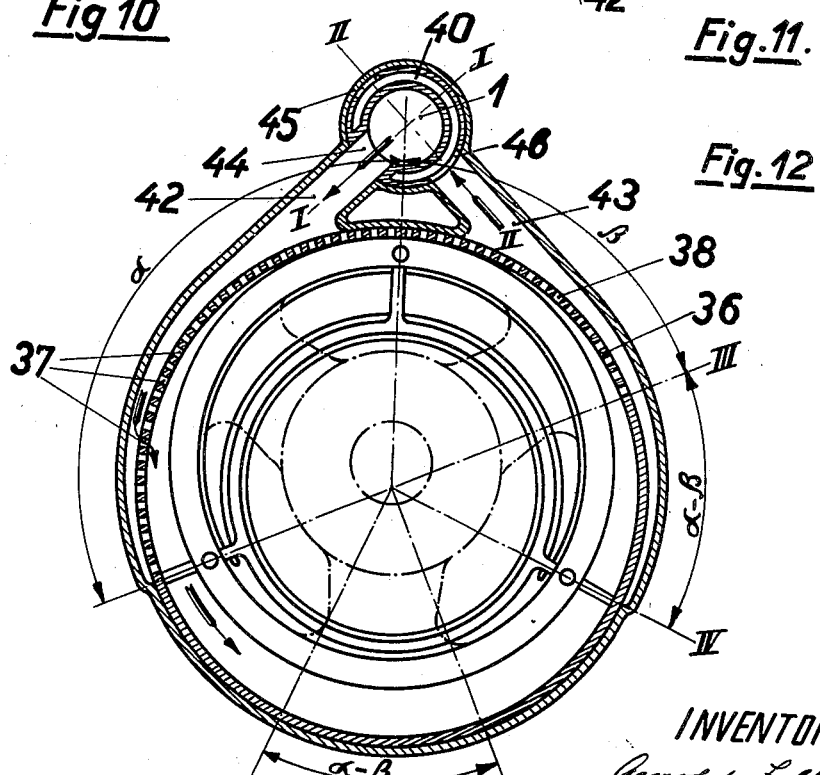

1,549,427

UNITED STATES PATENT OFFICE.

ARNOLD ZOLLER, OF BERLIN, GERMANY.

INTERNAL-COMBUSTION ENGINE.

Application filed August 29, 1921. Serial No. 496,444.

(GRANTED UNDER THE PROVISIONS OF THE ACT OF MARCH 3, 1921, 41 STAT. L., 1313.)

*To all whom it may concern:*

Be it known that I, ARNOLD ZOLLER, a Swiss citizen, residing at Berlin, Germany, have invented certain new and useful Improvements in Internal-Combustion Engines (for which I have filed applications in Germany June 8, 1918; Sweden, June 28, 1920; France, June 30, 1920; Belgium, July 3, 1920; England, July 6, 1920; Poland, July 8, 1920; Italy, July 10, 1920; Czechoslovakia, July 10, 1920; Austria, July 12, 1920; Finland, Aug. 6, 1920; Holland, Aug. 13, 1920; Hungary, Aug. 23, 1920; Norway, Aug. 27, 1920; Spain, Aug. 31, 1920; Denmark, Aug. 14, 1920; Rumania, March 30, 1921), of which the following is a specification.

My invention relates to internal combustion engines and more especially to a rotary compressor which is particularly suitable for multicylinder two stroke engines but can also be used with four stroke engines and can be used for compressing the air or the mixture of fuel and air for scavenging the working cylinders as well as for introducing and atomizing the fuel in the working cylinders.

According to the present invention the rotary compressor is fitted in known manner with a number of blades each of which is given a definitive angle of advance with regard to the crank of any particular cylinder; with three working cylinders therefore three blades would be provided which are not disposed at the same angle one to the other but at different angles so that as the distance of a cylinder from the rotary compressor increases, the angle alters. This is done in order to take into account that the pressure in the pipes to the several cylinders does not remain constant but moves in wave form. The angle of advance of a blade must be so selected that the pressure wave to a particular working cylinder reaches its highest point (maximum pressure) immediately at the moment when the air, or mixture of air and fuel is about to enter the cylinder. In this way each blade furnishes the air necessary for scavenging a cylinder in sufficient quantity and at sufficient pressure.

My invention further comprises the arrangement of an adjusting device which may for example take the form of a rotatable sleeve for the purpose of obtaining a constant pressure at the end of the compression stroke in the working cylinder in cases where the quantity of air or gas supplied varies.

Further constructions comprised in the invention relate to control devices in order that the compressor may be used as a starting device or as a means for storing up energy, for example for braking purposes. Moreover the compressor can be provided with a circulating device in order to lead back a part of the compressed air or of the compressed gas and air mixture from the pressure side to the suction side of the compressor; this is of importance in the application of the invention to aircraft the cylinders of which at great heights must be supplied with a greater volume of air to give the same pressure at the end of the compression stroke as at lesser heights. Finally reversing arrangements may be so formed that the compressor can be used for reversing whether travelling forwards or backwards, an arrangement which is of particular importance for marine engines.

The compressor can be of the one-step or the multistep type.

In the drawings affixed to this specification and forming part thereof several modifications of a device embodying my invention are illustrated diagrammatically by way of example. In the drawings Fig. 1 is a vertical section through a three cylinder two stroke motor for heavy fuels with a two step compressor, one step of which serves for supplying the scavenging air, while the other step with high end pressure serves for producing the atomizing air.

Figs. 2 to 4 (the latter on a reduced scale) are sections respectively on the lines AA, BB, CC of Fig. 1.

Fig. 5 is a diagram of the working cylinder and Fig. 6 illustrates the corresponding positions of the arms of the compressor.

Fig. 7 is a section illustrating a construction of the compressor for motors with variable cylinder charges, for example aircraft engines with a rotary adjusting sleeve.

Fig. 8 is a diagrammatic representation of the corresponding cylinder charges $v^1$, $v^2$, $v^3$.

Fig. 9 is a partial section of a modification of the compressor for starting and braking the engine.

Figs. 10 and 11 are enlarged sectional views on the lines I—I and II—II of Fig. 12 respectively, and Fig. 12 is a section of a modification of the compressor for reversible engines, for example marine engines having the same working power for forward or backward travelling.

Referring to the drawings, in the construction illustrated in Figs. 1 to 4, 1 is the closed crank casing to which is attached the cylinder casing 2 with the cylinders 3, 4 and 5. The pistons of the cylinders 3, 4 and 5 are connected by means of piston rods to cranks on the shaft 6 set at 120°. The crank shaft 6 carries outside the casing 1 a ring 8 (compressor I) which acts at the same time as a fly wheel, and in this ring are arranged in rotatably mounted pins 9 the three radially sliding blades 10 which are also adjustable circumferentially of the compressor. Each blade 10 is furnished with a slide part 11 which is guided in a circular groove 12 in the fixed casing 14. The centre of the groove 12 lies outside the axis of the crank shaft, so that on the rotation of the ring 8 the blades 10 are moved radially inwards and outwards with regard to the fly wheel 8. The blades 10 which slide on the sides of the compressor casing 14 force the air required for scavenging into the cylinders.

An air pipe 16 leads into the casing and ends in a charging space 17. The latter extends over part of the circumference of the compressor casing 14. To the latter there is further connected an air outlet channel 18 through which the compressed scavenging air is led to the several cylinders 3, 4 and 5. For this purpose each cylinder is provided with an air transmitting passage 19 (Fig. 4) with an opening into the interior of the cylinder controlled by the piston.

To the ring 8 there is rigidly fixed in the construction illustrated a second ring 20 (compressor II) which rotates in a special casing 21. The ring 20 is likewise provided with three blades 22 (Fig. 3) which are arranged to slide radially in pins 23 on the ring 20, and by means of guide parts 24 engage in a guiding groove 25. The groove 25 is circular and has its centre point outside the axis of the crank shaft, so that the blades 22 on the rotation of the ring 20 are displaced radially inwards and outwards. The casing 21 is provided with an air inlet 27 which is connected to the pressure pipe 18 of the compressor I and further with an air exit 28 from which a pipe 29 leads to the fuel injection device 30 of the cylinders 3, 4 and 5. In the pipe 29 there is provided an adjustable three-way cock 31 by means of which is controlled not only the through passage from 28 to the pipe 29 but also the connection of the pipe 29 with the pipe 18.

The second compressor II can be made multistep for heavy fuels.

In the construction according to Fig. 9 only one compression is used which as above described serves for scavenging or may also be used for injecting the fuel, but at the same time it is constructed for starting and braking the engine. In this case there is provided again in the casing of the compressor, as in Fig. 3, a three-way cock 31 which controls a pipe 33 leading to a compressed air reservoir not shown in the drawing, into which compressed air for a variety of purposes (e. g. braking the vehicle etc.) can be admitted. There is further provided on the casing, (see Fig. 9) and on the suction side of the compressor a second three-way cock 35 which controls the pipe from the compressed air reservoir 50 to the compressor and can put the compressor either in connection with the atmosphere for drawing in air or in connection with the compressed air reservoir 50 for the purpose of starting the motor.

When the compressor is used as the starting device compressed air is allowed to act upon the arms of the compressor. If the suction side of the compressor is placed by means of the three way cock 35 in connection with the compressed air reservoir 50, the compressed air can stream into the compressor casing when the cock is opened and act upon the first arm, whilst the suction opening controlled by the cock 35 remains closed. Where the compressed air acts on two arms of the compressor at once the compressed air acts upon the larger of the two surfaces with the greater effect and so causes the crank shaft to rotate.

This arrangement has the advantage, as compared with known arrangements in which the compressed air streams into the working cylinder of the engine and acts upon the crank shaft through the piston rods, that the turning force is applied with considerably greater leverage than if applied to the engine crank so that only one-sixth or one-seventh of the pressure is required. Instead of compressed air a compressed mixture of gas and air may be used for starting, in which case the escaping mixture is led back into the scavenging passage.

When the compressor is to be used for braking the engine, the delivery side of the compressor is put in connection by means of the three-way cock 31 with the compressed air reservoir 50, the momentum of the engine before it is stopped being used to produce compressed air, which is either used for scavenging the cylinder or is transferred to another reservoir not shown, for other purposes such as braking the rear wheels by a compressed air brake effecting couplings, driving pneumatic pumps, whistling, pneumatic tipping devices, pneumatic suspension, etc. The advantages of employing rotating elements to compress the air and so brake the engine in place of using the reciprocating cylinder pistons are very considerable, and the same braking action, as stated above in connection with the starting action, can be obtained with one-sixth or one-seventh of the pressure; with the reduced pressure and increased radius the brake is more elastic. The brake can also be applied by partly closing the cock 31 as the air passes into the compressed air reservoir, since when the brake is being applied no scavenging or practically none is required. If the compressed air reservoir 50 has previously been filled, the brake can still be applied, the braking air being introduced from the cylinder 50 into one of the working cylinders during the suction part of the piston stroke or by any suitable control of the valves.

In the construction shown in Fig. 7 a rotatable sleeve $x$ is adjustably arranged within the compressor for the scavenging air; this sleeve is provided with slots $x_1$, $x_2$ of different sizes for inlet and outlet. This arrangement makes possible any desired change in the cylinder charging which is effected by throttling in the inlet element 16 which is however so effected that notwithstanding the throttling of the quantity drawn in the maximum pressure of the scavenging air remains constant.

It is old to provide a control valve on the carburetor of four stroke engines by means of which the volume drawn in is regulated, from the smallest quantity necessary to produce an explosion up to the largest quantity, according to the volumetric efficiency which is determined by the passages, valves, etc. Under the best conditions possible however the theoretically correct cylinder volume cannot be obtained and there are losses of from 6 to 10% of the cylinder volume. At a low number of revolutions, which is obtained by throttling the carburetor the cylinder volume enters the cylinder at so much the lower pressure, the greater the suction speed, that is to say the greater the throttling, so that the suction volume drops considerably. Since during the preceding exhaust period the whole cylinder volume of burnt gases is driven out and only the volume corresponding to the compression space remains constant in the cylinder, this mixes with the fresh gas volume, so that the total volume at any time at the beginning of the compression is varied by the variability of the volume of the charge drawn in and so is the whole compression, that is to say at a low number of revolutions the four stroke motor has a lower compression pressure and consequently explosion pressure and a lower degree of efficiency which as is known rapidly sinks with the number of revolutions.

By means of this sleeve $x$ according to the invention it is possible to carry out the variation of the cylinder charges in two and four stroke engines in such a way that the pressure at the end of the compression stroke is constant and the power developed by the engine will depend simply upon the extent of charging of the cylinder with fresh gases. The variability of the volume of the charge is such that it is possible to vary it with ease from the smallest ignitable mixture up to the complete cylinder charge, so that at a low number of revolutions the efficiency is comparatively high and increases the capacity of the motor which is of particular importance for motor lorries and stationary plants and the like. On the other hand with this arrangement it is made possible to bring the cylinder charge above the level known in four stroke engines, freeing the compression volume from the gases of combustion. The arrangement therefore makes possible an extreme range of control of the charging of the cylinders with fresh gases for the purpose of partly or completely excluding the change of speed which has hitherto been necessary with motor lorries.

By means of the rotatable sleeve $x$ and a suitable positioning of the suction opening $x_1$ with regard to the air inlet, the suction volume is regulated from the minimum up to the maximum volume contained between two arms of the compressor and the compression phase can be prolonged according to this suction volume so that at the end of the compression stroke the pressure of the charge can be kept constant. In Figs. 7 and 8 $v^1$, $v^2$, $v^3$ indicate respectively three different cylinder charges of 33%, 86% and 100%. The angles $\alpha^1$, $\alpha^2$ etc. in Fig. 7 indicate the angular positions of the sleeve $x$ corresponding to the different volumes.

To reverse the engine there may be provided the device illustrated in Figs. 10 to 12. The device comprises a distribution cock 40 which is built into the pipe 41 supplying fresh air or air coming from the carburettor. The cock 40 controls two pipes 42, 43 provided in the compressor casing and arranged at 90° to one another. It has a passage 44 connecting with the pipe 41 and exit openings 45, 46 at 180° to one another which connect the compressor casing with the cylinders etc. For turning the cock 41 any known device (not shown in the drawings) can be provided. If the cock 40 is brought into the position shown in Fig. 12, the air entering is drawn in through the slots 37 in the distributor sleeve 36, and these slots are arranged in the sleeve 36 in such a way that the maximum degree of charge of the volume contained between two arms of the compressor is obtained. The angle contained between the two arms is indicated by $\alpha$. On the compression side the exit slots 38 in the distributing sleeve 36 are not uncovered until the compression has reached the necessary pressure inside; this occurs in the present case when the compressing arm has reached the position indicated by the angle β. The scavenging air after the necessary pressure has been attained is now led through the exhaust slots 38 and through the slot 46 in the open distributing cock 40 to the working cylinders if the arms are rotating in the direction of the arrow in Fig. 12. For reversing it is necessary to turn the cock 40 into the position II and to turn the distributor sleeve 36 in the direction of rotation which it is desired to obtain through an angle α-β and to bring it from the position III to the position IV so that the point of suction comes on to the opposite side as does also the point of exhaust. The scavenging air will pass through the second opening 45 in the distributing cock 40 to the working cylinders. In this arrangement the compressor would have the same degree of capacity in the reverse direction as in the forward direction. The two levers of the distributing cock 40 and the sleeve 36 may be connected together so that the reversing can be effected by the movement of a single lever on turning the distributing cock from the position I to the position II the compressor is momentarily throttled so that the compressor acts as an engine brake and in this case the number of the revolutions of the engine will automatically be reduced to the number necessary for reversing.

The manner of operation of the arrangement shown in Figs. 1 to 6 is as follows:

On the engine starting the rings 8 and 20 revolve the shaft 6. The arms 10 and 22 force forward the air in the following manner. Each of the arms 10, of which in the present example there are provided three, corresponding to the number of cylinders, furnishes the necessary quantity of air to one of the cylinders 3, 4 or 5. As the distances of the cylinders 3, 4, 5 from the compressor, and consequently the resistances in the pipes vary the arms 10 are set with regard to one another so that even cylinder 3 which is furthest away receives the quantity of air required for complete scavenging. The disposition of the arms 10 therefore for three cylinders is not at 120° but varies according to the distance of the compressor from the particular cylinder. In order that the air may enter the cylinder at the right moment immediately after the opening of the scavenging passage and may enter under the maximum pressure, the arm is set at a particular leading angle with regard to the crank of the particular cylinder, so that the entering scavenging air always has a quite definite excess of pressure over the escaping gases. The action which takes place within the cylinder during an exhaust is illustrated in diagram in Figs. 5 and 6. When the exhaust is open and the crank is at $a$ the pressure drops from $b$ Fig. 6. The scavenging air then enters when the crank reaches the position $c$. At this moment the escaping exhaust gases have a density corresponding to the ordinates $d, e$. The entering scavenging air however has a pressure corresponding to the ordinates $f, e$ the pressure of the scavenging air is therefore greater than the pressure of the escaping gases by the difference $d, f$ between ordinates. This difference in pressure remains during the whole period of exhaust almost constant. The method of operation peculiar to the rotary compressor, by which waves of compressed air are supplied, is here made full use of for a wave reaches the cylinder immediately after the opening of the inlet passage and the air at the highest pressure enters the cylinder where the exploded gases have expanded. The speed at which the air leaves the compressor is here also made use of; the air streams out into the cylinder without working losses such as must otherwise occur through the lifting of valves, pressure equalizing chambers or the like.

If the compressor is to be used for supplying pure scavenging air to the individual cylinders it forces this air into the cylinder in waves which are exactly timed to the operation of the cylinders. The heads of the pressure waves lie immediately at the point of entry of each cylinder so that the maximum pressure is made use of for scavenging and atomizing purposes.

With heavy oil engines operating by atomization an approximately constant air pressure is required for forcing the fuel into the cylinder. To attain this the air compressed in compressor I is led into the second compressor II, which further compresses the volume of air entering at varying pressure, by means of the arms 22 which are set with reference to the arms 19 to correspond with the higher compression that is to be obtained. The extent of the pressure and the quantity of compressed air which is used for introducing the fuel and for atomizing it can be varied by adjustment of the cock 31 (Fig. 3).

In order that the engine may be used on a flying machine successfully at great heights the dimensions of the compressor are selected so that even at the maximum height of flying where the air is very much rarified the cylinders are supplied with the necessary quantity of air or petrol vapour at a suitable pressure for obtaining maximum efficiency. This renders the charge of the cylinders too large for flying at low altitudes but this can easily be compensated by the use of the excess of scavenging air for other purposes (for example for storing up energy for braking) or by transferring to the suction side of the compressor or by like means. If a flying machine engine for example has a cylinder volume of one litre, the volume of air furnished by the compressor between two arms should be about three litres which is from time to time compressed by the compressor. By means of a transferring passage provided with a cock, about one-third of this volume or one litre is supplied to the cylinder during normal flight at low altitudes and two-thirds of the quantity supplied is led to the suction side of the compressor and there by its expansion gives up again its energy to the compressor arms with the smallest loss of energy. During flight at higher altitudes the quantity of air supplied by the compressor is distributed, according to the height of the flight, so that the engine always retains its full output as on the earth's surface notwithstanding the rarefication of the air, the whole volume supplied by the compressor being supplied if necessary to the working cylinders.

The construction of the compressor for this purpose resembles essentially the compressor for starting and braking the engine (Fig. 9) but without the pressure reservoir 50 between the cocks 3, 5 and 13. These cocks are retained; by means of them a part of the compressed air is led from the delivery side of the compressor, i. e. by the passage 28, to the suction side, while the flying machine remains at low altitudes. When it rises to a great height and a greater volume of air is required the cock 35 is closed and the whole of the compressed air is furnished to the engine cylinders.

I claim:

1. In an internal combustion engine in combination, a plurality of cylinders, a rotary compressor and a plurality of blades connected with said compressor, each blade being adapted to supply a separate cylinder with a compressed gaseous medium.

2. In an internal combustion engine in combination, a plurality of cylinders, a rotary compressor and a plurality of blades connected with said compressor, each blade being adapted to supply a separate cylinder with a compressed gaseous medium, the arrangement of said blades with regard to the compressor axis corresponding to the distance between said compressor and the respective cylinders.

3. In an internal combustion engine in combination, a plurality of cylinders, a piston movable in each cylinder, a rotary compressor and a plurality of blades connected with said compressor, each blade being adapted to supply a separate cylinder with a compressed gaseous medium, and its rotary motion being so timed, that the gaseous medium will reach the inlet of said cylinder in its state of highest compression as the inlet is being opened.

4. In an internal combustion engine in combination, a plurality of cylinders, a piston movable in each cylinder, a crank shaft operatively connected with said pistons, a rotary compressor on said crank shaft, a plurality of blades connected with said compressor, each blade being adapted to supply a separate cylinder with a compressed gaseous medium, and a second compressor on said crank shaft for further compressing said medium, before it reaches said cylinder.

5. In an internal combustion engine in combination, a plurality of cylinders, a piston movable in each cylinder, a crank shaft operatively connected with said pistons, a rotary compressor on said crank shaft, a plurality of blades connected with said compressor, each blade being adapted to supply a separate cylinder with a compressed gaseous medium, and a second multi-step compressor on said crank shaft for further compressing said medium, before it reaches said cylinder.

6. In an internal combustion engine in combination, a plurality of cylinders, a rotary compressor and a plurality of blades connected with said compressor, each blade being capable of being adjusted circumferentially and being adapted to supply a separate cylinder with a compressed gaseous medium.

7. In an internal combustion engine in combination, a plurality of cylinders, a rotary compressor and a plurality of blades connected with said compressor, each blade being capable of moving radially and of being adjusted circumferentially and being adapted to supply a separate cylinder with a compressed gaseous medium.

8. In an internal combustion engine in combination, a plurality of cylinders, a rotary compressor, a plurality of blades connected with said compressor, each blade being adapted to supply a separate cylinder with a compressed gaseous medium and adjusting means on said compressor for obtaining constant compression in each cylinder regardless of any variation of the quantity of gaseous medium supplied.

9. In an internal combustion engine in combination, a plurality of cylinders, a rotary compressor, a plurality of blades connected with said compressor, each blade being adapted to supply a separate cylinder with a compressed gaseous medium and a rotatable sleeve provided with an inlet and an outlet in said compressor for obtaining constant compression in each cylinder regardless of any variation of the quantity of gaseous medium supplied.

10. In an internal combustion engine in combination, a plurality of cylinders, a rotary compressor, a plurality of blades connected with said compressor, each blade being adapted to supply a separate cylinder with a compressed gaseous medium, a compressed air reservoir and a suction canal connected with said compressor and a three-way cock inserted in said canal.

11. In an internal combustion engine in combination, a plurality of cylinders, a rotary compressor, a plurality of blades connected with said compressor, each blade being adapted to supply a separate cylinder with a compressed gaseous medium, a compressed air reservoir and a compression canal connected with said compressor and a three-way cock inserted in said canal.

12. In an internal combustion engine in combination, a plurality of cylinders, a rotary compressor, a plurality of blades connected with said compressor, each blade being adapted to supply a separate cylinder with a compressed gaseous medium, a compressed air reservoir, a suction and a compression canal and a three-way cock inserted in each of said canals.

In testimony whereof I affix my signature.

ARNOLD ZOLLER.